Sept. 29, 1959        C. CANTELE ET AL        2,906,556
EXPANSIBLE STRUCTURE PROVIDING A VEHICULAR ENCLOSURE
BOTH WHEN COMPACTED AND EXTENDED
Filed June 14, 1954        11 Sheets-Sheet 1

INVENTORS
Carlo Cantele and Angelo Vanessori
BY
Kriger Bros
attorneys

Sept. 29, 1959   C. CANTELE ET AL   2,906,556
EXPANSIBLE STRUCTURE PROVIDING A VEHICULAR ENCLOSURE
BOTH WHEN COMPACTED AND EXTENDED
Filed June 14, 1954   11 Sheets-Sheet 2

INVENTORS
Carlo Cantele and Angelo Vanossi
BY
Knight Bros,
Attorneys

Sept. 29, 1959     C. CANTELE ET AL     2,906,556
EXPANSIBLE STRUCTURE PROVIDING A VEHICULAR ENCLOSURE
BOTH WHEN COMPACTED AND EXTENDED
Filed June 14, 1954     11 Sheets-Sheet 4

INVENTORS
Carlo Cantele and Angelo Vanessori
BY
Knight Bros.
Attorneys

Sept. 29, 1959      C. CANTELE ET AL      2,906,556
   EXPANSIBLE STRUCTURE PROVIDING A VEHICULAR ENCLOSURE
            BOTH WHEN COMPACTED AND EXTENDED
Filed June 14, 1954                       11 Sheets-Sheet 7

Sept. 29, 1959          C. CANTELE ET AL         2,906,556
EXPANSIBLE STRUCTURE PROVIDING A VEHICULAR ENCLOSURE
BOTH WHEN COMPACTED AND EXTENDED
Filed June 14, 1954                           11 Sheets-Sheet 8

INVENTORS
Carlo Cantele and Angelo Vanassoni
BY
Knight Bros.
Attorneys

Sept. 29, 1959     C. CANTELE ET AL     2,906,556
EXPANSIBLE STRUCTURE PROVIDING A VEHICULAR ENCLOSURE
BOTH WHEN COMPACTED AND EXTENDED
Filed June 14, 1954     11 Sheets-Sheet 9

INVENTORS
Carlo Cantele and Angelo Vavassori
BY

United States Patent Office 2,906,556
Patented Sept. 29, 1959

2,906,556

EXPANSIBLE STRUCTURE PROVIDING A VEHICULAR ENCLOSURE BOTH WHEN COMPACTED AND EXTENDED

Carlo Cantele and Angelo Vavassori, Milan, Italy, assignors to Montecatini, Società Generale per l'Industria Mineraria e Chimica, a corporation of Italy Application June 14, 1954, Serial No. 436,659

Claims priority, application Italy June 13, 1953

28 Claims. (Cl. 296—26)

This invention relates to bodies, enclosures, or structures which can be expanded without use of additional or separate parts and can again be reduced to their original size.

Such bodies may be used particularly in conjunction with wheeled vehicles of all kinds, such as motor cars, floats, amphibious carriers, aircraft and the like. With the conventional carriers, the possibility of enlarging the capacity is relatively restricted and, in order to obtain a sizable enlargement, recourse is taken primarily to non-rigid superstructures such as tarpaulin covers and the like. On the other hand, whenever enlargements are obtained by means of rigid structures, the expansion of space is possible only by sacrificing part of the carrying capacity of the vehicle because of the bulky nature of the material required for the enlargement.

Now a system has been found whereby shortcomings, such as the above-mentioned, are eliminated. According to this disclosure, the increase in size is obtained by simply displacing the outer walls of the body which, in the unexpanded state, such as during transit, comprises a plurality of substantially two-dimensional elements, closely superimposed upon each other. The system of expansible bodies according to this invention is substantially based upon the simultaneous relocation of rigid assemblies made up at least of a roof and two walls for enclosing the space whose enlargement is required, by simultaneously moving said elements in two different directions perpendicular to each other. Under certain conditions, this may result in practically an oblique relocation of certain parts with respect to the initial position.

Another distinctive feature of this invention is the possibility of simultaneously enlarging the entire space, either in a longitudinal or transverse direction, without breaks or gaps in the perimetric body surface.

The features which we consider characteristic of our invention will be set forth in the appended claims. For a clear understanding, however, of the construction and operation of the herein disclosed expandable bodies, reference is made to the accompanying drawings which, in illustrating several embodiments, should be considered as illustrating, but in no way limiting the present invention.

Referring in greater detail to Figs. 1 to 12, inclusive, there is shown an automobile trailer comprising a frame having hinges 10' and 10". Hinged to the sides of the frame are a number of brackets which may be rectangular brackets such as brackets 11, or triangular brackets such as the brackets 11'. Brackets 11 and 11' each have an upwardly bracing arm designated 11a or 11b. These brackets are mounted so as to permit rotation over an arc of about 180°. By means of pins these brackets are connected to the lower edges of the side walls 2, 2' which, in turn, are rigidly connected with the back wall sections 3, 3' and with the roof sections 7, 7'. Hinged to the front part of the walls 2, 2' are short wall sections 1, 1' (Fig. 6) which, in turn, are hinged at the other end to equally short stationary wall sections 4, 4' of the expandable body.

Figure 5:
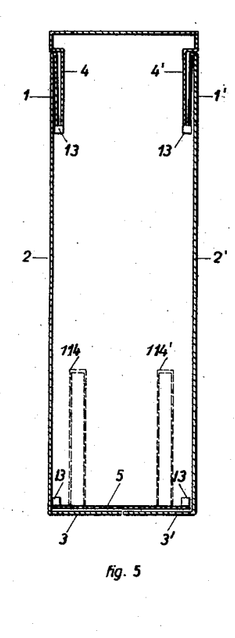
Figs. 5, 6 and 7 illustrate bottom sections of the unexpanded and expanded trailer body.

As may be seen from Fig. 5 which illustrates the embodiment in the unexpanded state, the short, hinged wall sections 1, 1' (which are supported by one of the brackets 11 or 11') are mounted plane-parallel with, and in close proximity to, the wall sections 4, 4' of the stationary part of the body and also plane-parallel and in close proximity to the front part of the side wall 2, 2'. At the rear, the wall sections 3, 3' are similarly stacked against the rear wall 5.

Figure 6:
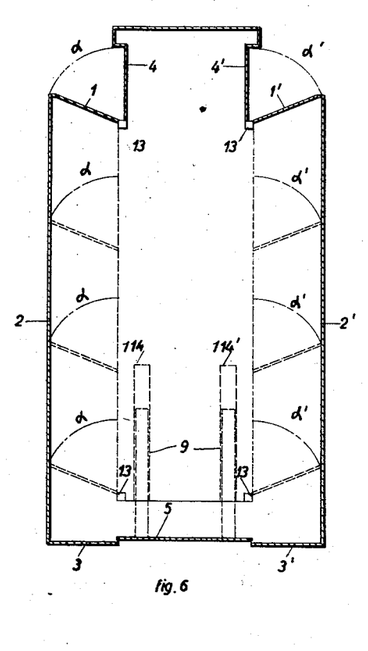
Figure 7:
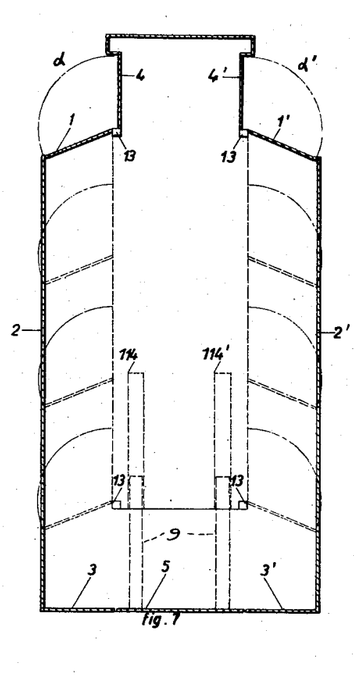
Figure 8:
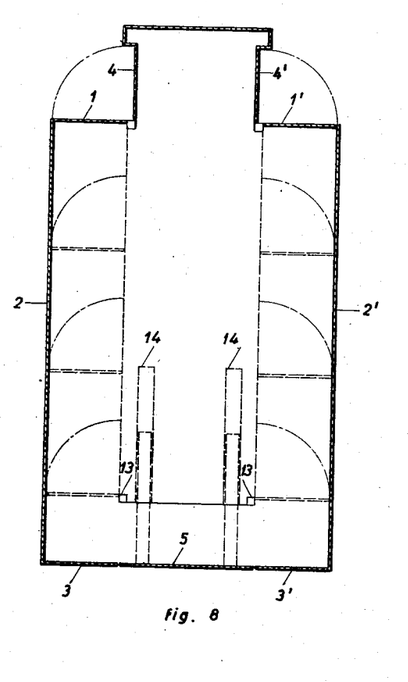
Figs. 8 and 9 show the trailer in a transversely and longitudinally expanded state.

In order to expand the body, the wall sections 1 and 1', and brackets 11 or 11', are rotated through the angles "α, α'" as shown in Fig. 6. The assembly, which also comprises roof sections 7, 7' rigidly connected with the side wall sections 2, 2' and rear wall sections 3, 3', respectively, follows the movement of the brackets, first to a position of maximum width, as shown in Fig. 8, and, if the brackets are rotated over an angle which is greater than 90°, to a position illustrated in Fig. 7 in which a greater increase in length of the expandable body compensates for a smaller increase in width.

While this lateral expansion is taking place, a rear platform comprising elements 9, slidingly mounted in guides 114, 114', is moved backward in such a manner that the rear wall 5 remains in contact with the rearwardly and laterally moving wall sections 3, 3' of the movable assembly, in order to close the gap which develops between the wall sections 3 and 3' during the expansion. Furthermore, the roof sections 7, 7', which, at the unexpanded stage, are superimposed upon the stationary roof section 8, uncover the latter, while the roof section 5', ordinarily located beneath the roof section 8, is moved backward with the platform 9 and the rear wall 5.

Figure 1:
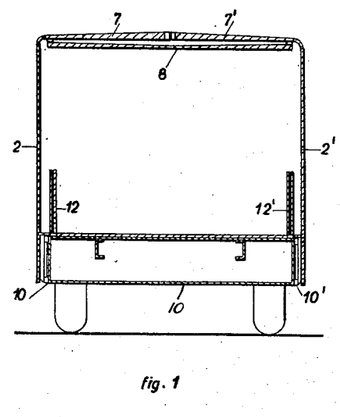
Figs. 1 and 2 represent sectional views of a trailer in the unexpanded and expanded state, respectively.
Figure 2:
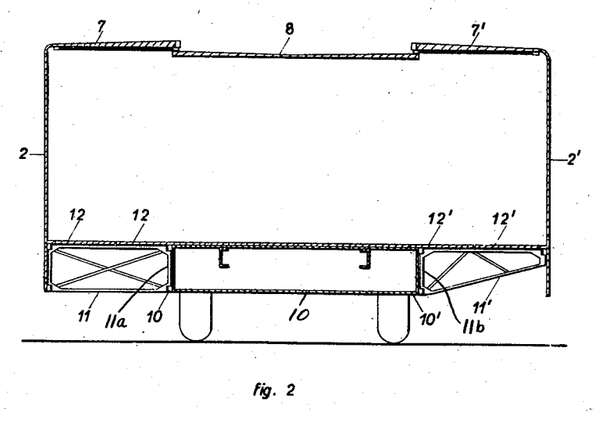
Figure 3:
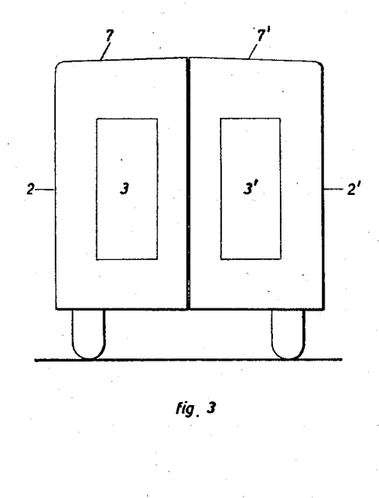
Figs. 3 and 4 represent schematic rear views of the trailer in the unexpanded and expanded state.
Figure 4:
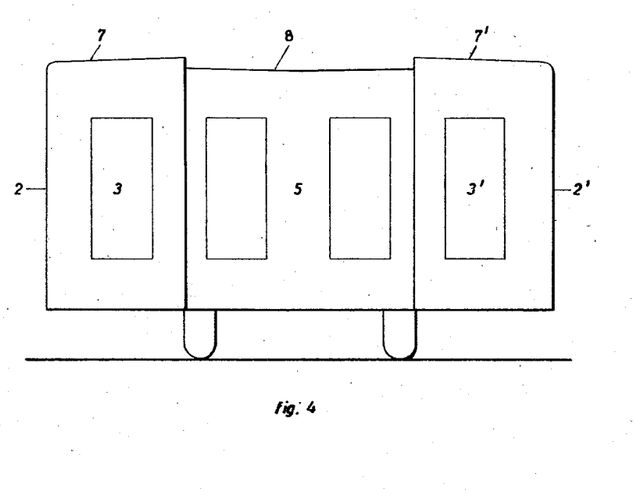

In order to retain the various sections in rigid alignment during the expanding operation, arms 16, 16' are hinged to the upper edges of the wall sections 2, 2'. However, no supporting function is assigned to these arms since it is solely the function of the brackets 11, 11' to support the expanded assembly. In order to provide the additional flooring which is required upon expansion, recourse may be had either to sliding floors (not illustrated) or to tilting planks 12, 12' which, as shown in Figs. 1 and 2, may be hinged to either the stationary or the movable floor sections. These planks 12 are held in an upright position within the unexpanded body. Upon tilting the sections downward after expansion, they provide a flooring which is level with the floor of the unexpanded section. Similar flooring arrangements may be provided for the expandable rear platform 9.

Figure 9:
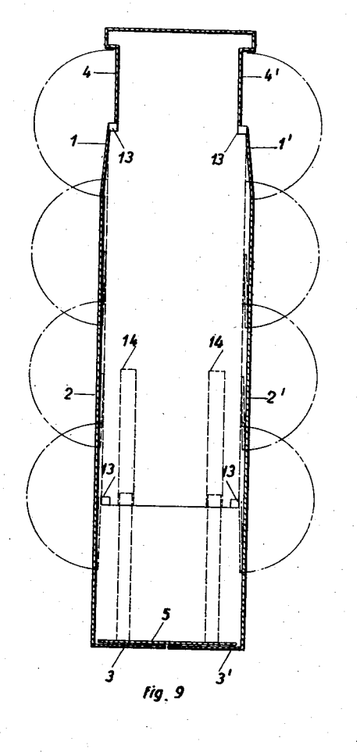
Figure 10:
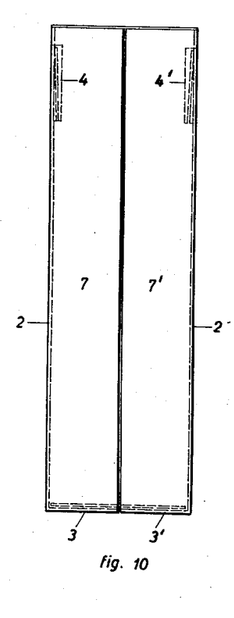
Figs. 10, 11 and 12 are top views which illustrate the roof section of the trailer at various stages of expansion.
Figure 11:
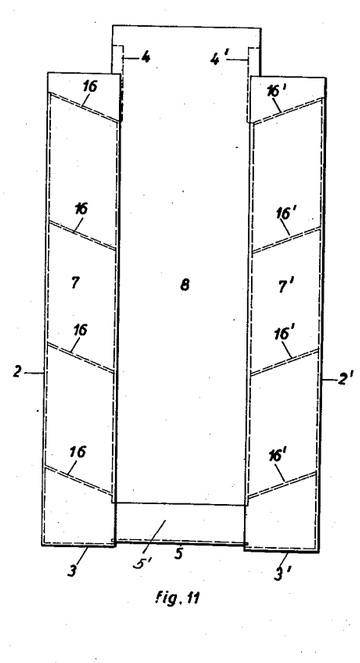
Figure 12:
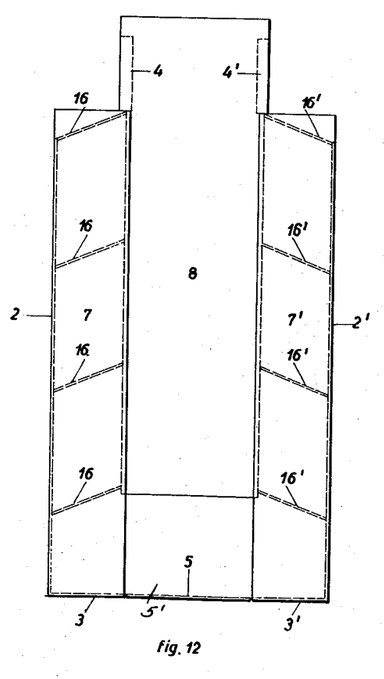
Figure 13:
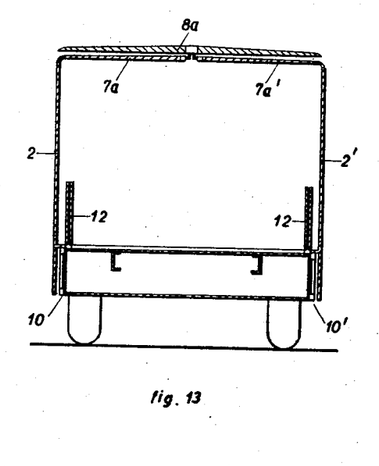
Figs. 13 and 14 are transverse sections of a trailer, showing a different construction of the roof.
Figure 14:
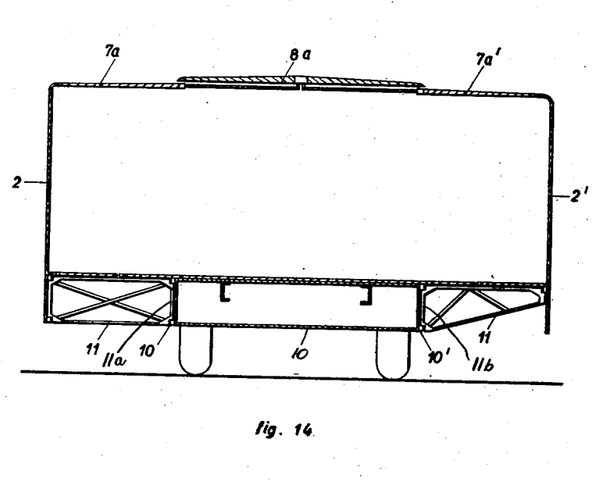
Figure 15:
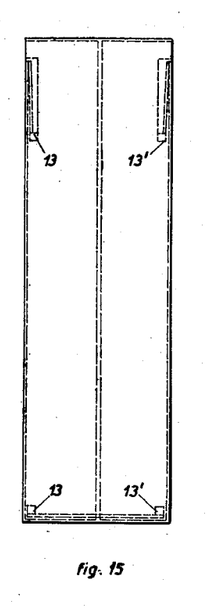
Figs. 15 and 16 are top views of the trailer shown in Figs. 13 and 14.

Since, obviously, the brackets 11, 11' may be rotated over an angle in excess of 90° and up to 180°, the result of such further rotation will be an increase, not in width, but of the length, of the expandable body, such an increase in length is illustrated in Fig. 9.

The width of each of the roof sections 7, 7' is approximately one-half of that of the stationary roof 8. Preferably the roof 8 is somewhat longer than the unexpanded body. It is obvious, that a stationary wall at the rear is not a requirement. The opening resulting from the parting of the walls 3, 3' may be covered either by means of sliding walls mounted adjacent to the inside of the walls 3, 3', by means of hinged doors fastened thereto or by means of a canvas cover, etc.

Figure 16:
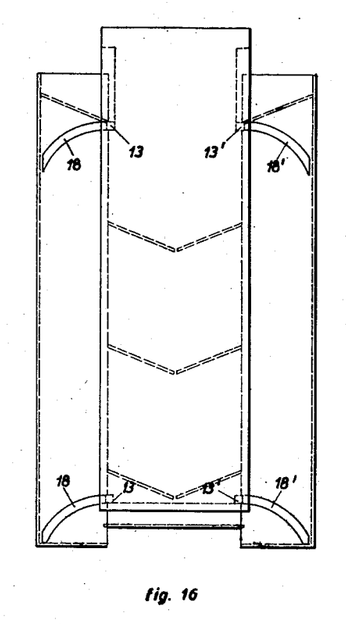

Figs. 13 to 16, inclusive, illustrate a slightly different embodiment in which, in the unexpanded state, a stationary roof 8a is mounted above the movable roof sections 7a, 7a'. In this instance, suitable slots 18 must be provided in order to permit the outward movement of these roof sections notwithstanding the presence of four columns 13, 13' provided as supports for the roof 8a, as shown in Fig. 16.

Regardless of whether the roof sections 7, 7' or 7a, 7a' are mounted above or below the stationary roof 8 or 8a, respectively, the outward movement of these roof sections requires friction-reducing supports, say, in form of the guide rails having a semicircular cross-section and adapted to receive caster rollers.

In order to shed water the stationary roof sections of the first described embodiment preferably slope from the rim toward the center, to collect the rain water there for subsequent discharge by means of pipes.

Conventional apparatus may be adopted to facilitate the movements of the brackets 11, 11' when expanding the herein described bodies. For instance, pivots may be placed at the short side of the brackets and, depending in strength upon the expected load, can be provided either with holder or thrust-ball bearings, which, preferably, are locked to the frame itself by means of adjustable bolts.

All movable parts may be actuated simultaneously by means of a system of either cylindrical, conical or planetary gears, or a chain or wire arrangement which may be put in motion by either mechanical, hydraulic or electrical forces.

Such mechanical means for expanding the body and reducing it to original size are preferably mounted underneath the floor of the stationary frame. This is facilitated by extending at least one of the brackets or frames of one of the side walls toward the inside of the stationary frame, at a suitable angle to the bracket so that, at the unexpanded state of the body, this extension will form an angle of, say, 20° with the longitudinal axis of the body and thus facilitate the operative attachment of the necessary mechanical elements. Inasmuch as the movements of the two transversally relocated wall sections are equal, although in opposite directions, these wall sections may be connected with each other by means of telescope girders which, at the same time, will act as supports for the floors and roofs. Such a support is of particular importance at the rear section of the expandable body where these girders may even replace the movable rear platform 9.

Whenever the brackets 11, 11' are turned more than 90° in order to obtain an increase in length, in order to compensate for the simultaneous loss in added width which ordinarily occurs thereby, the brackets and frames are dimensioned in such a manner that the radius of the semicircle drawn by the edges of the brackets or frames is greater than the half-width of the closed body.

In this case, the upper arms 16, 16' and the upper edges of the bearing frames are provided with rollers for the sliding support of the moving roof sections. Ordinarily, at the maximum enlargement of the body attained upon a 90° rotation of the brackets, the roof sections 7, 7' are only supported by the rotatable arms 16. However, if a still larger increase in width is required and attained in the aforesaid manner, the required increase in the size of the roof sections may be accomplished by providing auxiliary roof sections hinged to the roof sections 7 or 7a, or by making these roof sections of sufficient width and mounting them in such a manner that they partially overlap each other at the unexpanded state.

Figure 17:
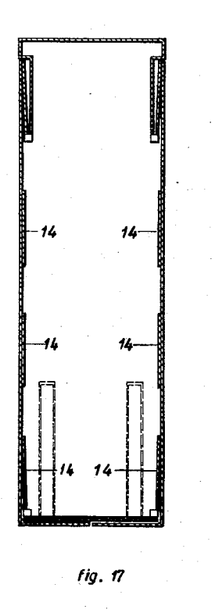
Figs. 17 and 18 are horizontal sectional views of the floor section of the trailer shown in Figs. 13 and 14.
Figure 18:
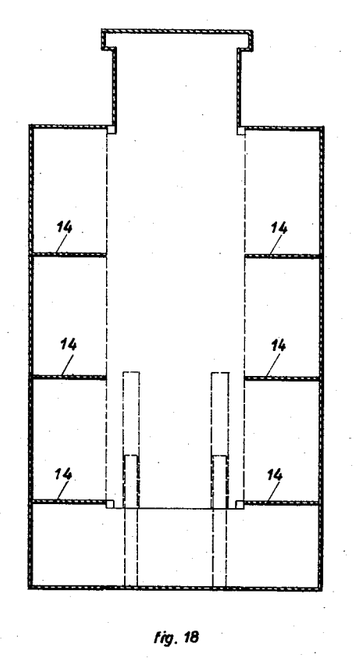

Whenever the presence of intermediary walls is not objectionable or even desired, the upper and lower brackets may be replaced by hinged frame sections 14, acting as bearing parts (Figs. 17, 18). Instead of entire wall sections, properly located support columns may be used.

Figure 19:
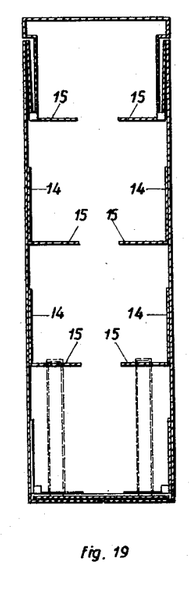
Figs. 19 and 20 are horizontal sectional views of a trailer comprising a plurality of compartments.
Figure 20:
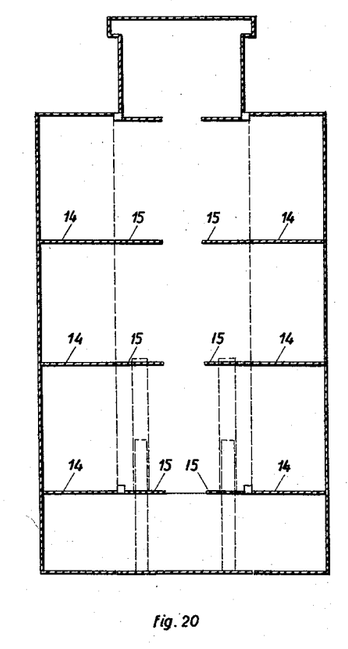

Similarly, if the entire enlarged body is to be transversely partitioned, in addition to the supporting walls 14, the stationary portion of the body can be provided with fixed partitions 15, in alignment with the partition 14, as shown in Figs. 19, 20. In this case, the supporting walls 14 of the movable sections may be hinged to the outer vertical edges of section 15 so that, upon expanding, the section 14 will move into line with the fixed section 15. In order to obtain straight partitions, the rotation of the brackets must, of course, be limited to 90°.

Locking devices obviously are necessary in order to keep the individual elements of the body in position, at the closed and at the opened state. Such locking devices may be mounted anywhere, either inside or outside and may be of a simple design, such as elbows or screw tie rods, etc.

Generally, the herein disclosed system is very rigid and very simple since all the elements required for stability are provided by the base frame, the revolving brackets or frames, the two longitudinal girders between the vertical walls (one near the revolving pivots and the other near the edge of the roof), and another longitudinal girder at the inner edge of the roof section. These longitudinal girders which, upon opening of the expandable body, partly overhang, serve to support the load of the rear section, or, if needed, of the small platform 9.

Figure 21:
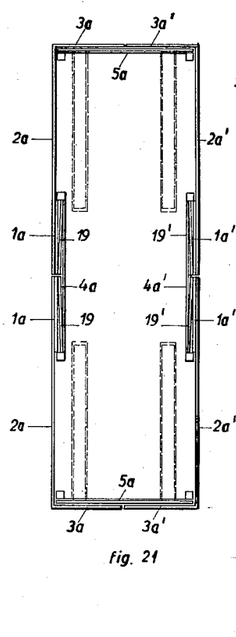
Figs. 21, 22 and 23 are sectional views of a trailer which can be expanded in four directions.
Figure 22:
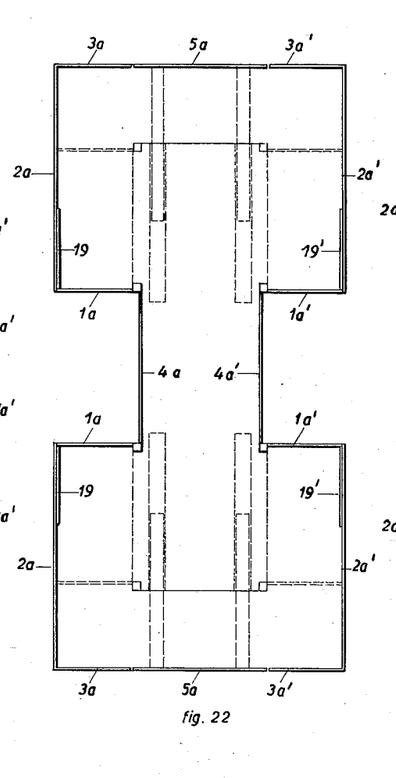
Figure 23:
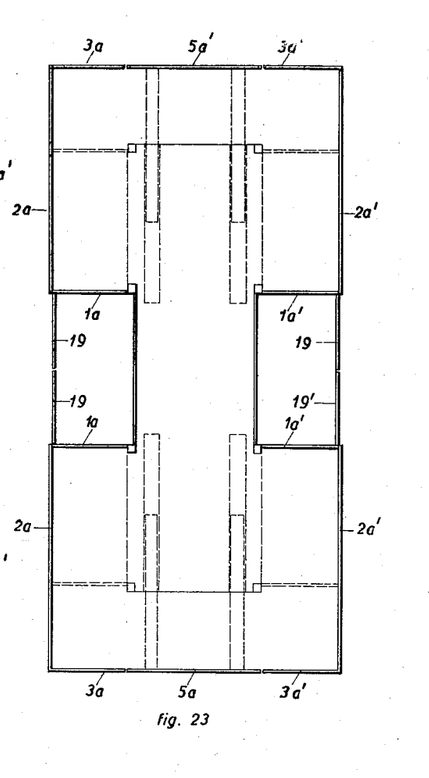
Figure 24:
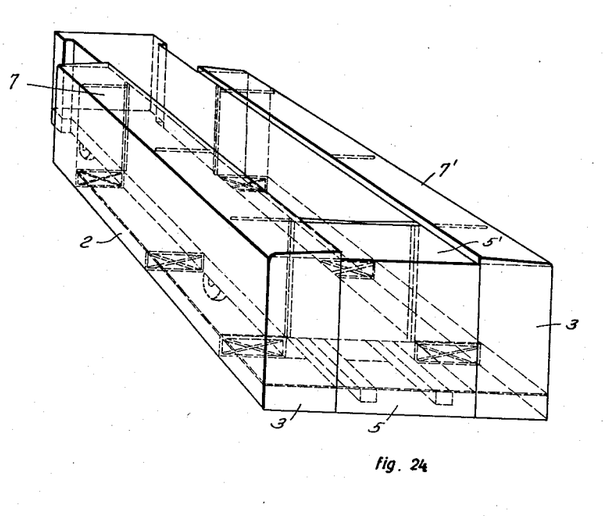
Fig. 24 is a perspective view of a trailer in expanded state.

Expansion may be effective not only in three directions, as shown, but also in a fourth direction as illustrated in Figs. 21, 22 and 23. In this case, the rigid wall sections 4 as shown in, say, Fig. 5, are replaced by rotatable frames 4a, 4a', while the walls 1, 1' are replaced by hinged frames 1a, 1a' if an unobstructed rectangular shape is to be obtained.

The walls 19, 19' sliding in grooves, are mounted inside of the walls 2a, 2a' and, upon opening, are positioned to fill the space between walls 2a and 2a', respectively.

Inasmuch as no guides are used in connection with this embodiment, the absence of mechanical attachments of this type contributes considerably toward reducing vibrations and noise within the moving trailer.

A further advantage is the complete utilization of the stationary parts at the unexpanded state in the same manner as in any other vehicular body; including the floor, the flooring and, if needed, the roof.

Moreover, the unexpanded body does not differ greatly from a normally non-expansible vehicular body, particularly in height, since the absence of bearing guides permits the laying of the flooring immediately above the trailer frame. The entire floor is entirely level, even in the unexpanded state, without the need of planks and the like.

We claim:

1. A hollow, oblong-rectangular vehicular body which is expandable in width and in length, by means of movement of movable elements in an oblique direction with respect to the body from which it is displaced, said body comprising as fixed elements a floor base, a front wall, a roof and two side wall sections extending back from said front wall and, as elements movable with respect to the fixed elements, two expanding sections each being hinged to the free vertical edge of one of said side wall sections, two expansion walls the front end of each being hinged to the free vertical edge of one of said expanding sections, two expanding rear wall sections fastened perpendicularly to the free vertical edges of said expansion walls so as to face each other, roof and floor sections of substantially the width of said expanding sections and the length of said expansion walls, said roof and floor sections being fastened, in a position facing each other, perpendicularly to the upper and lower edges, respectively, of said expansion walls and said expanding rear wall sections, and an expandable rear element consisting of a floor section, a rear wall fastened perpendicularly thereto and a roof section of substantially the size of said floor section fastened to said rear wall, whereby in the unexpanded state of the body said expanding sections and said floor-, roof- and rear wall-sections are plane-parallel and in close proximity with adjacent fixed elements of said body.

2. A vehicle body for a vehicle, the body being based on a stationary frame, said body having fixed parts and a part which is movable with respect to the fixed parts to expand the volume of the vehicle body transversely and rearwardly, said movable part comprising opposite longitudinal side wall structural sections and a number of strong side wall sections supporting brackets hingedly mounted along opposite sides of the frame, the brackets being rotatable forwardly and rearwardly about vertical axes through an angle greater than 90 degrees, the lower portions of said longitudinal wall structural sections being connected to and supported by the free end portions of said supports, said longitudinal wall structural sections being capable of displacement by movement of said supports, in which movement every point of the side wall structural sections describes an arc in horizontal plan, each side wall section as a whole being displaced both longitudinally and transversely, being kept parallel to its original longitudinal disposition in the unexpanded state, the reduced volume as well as the increased volume being limited laterally by the same longitudinal side wall structural sections, and rear transverse wall structure sections rigidly joined to and carried by the said side wall sections and extending toward each other to form at least part of the vehicle body rear end in reduced volume condition, and a rear platform structure mounted by said vehicle, the mounting permitting longitudinal movement toward the rear transverse sections in the expanded volume condition.

3. A vehicle body for a vehicle, the body being based on a stationary frame, said body having fixed parts including fixed roof structure and a part which is movable with respect to the fixed parts, when the vehicle is stopped, to expand the volume of the vehicle body beyond that in ordinary travelling condition, said movable part comprising opposite longitudinal side wall sections and a number of strong swingable supports for the side wall sections hinged along a side of the frame and rotatable with respect thereto around a vertical axis, the lower portion of said longitudinal wall sections being connected to and supported by the free ends of said supports, said longitudinal wall sections and said supports moving together, in which movement every point of the side wall sections describes an arc in horizontal plan, each side wall section as a whole being displaced both longitudinally and transversely, being kept parallel to its original longitudinal disposition present in the unexpanded state, the reduced volume in travel condition as well as the increased volume in non-running condition being limited laterally by the same longitudinal side wall sections, and rear transverse wall structure sections rigidly joined to the said side wall sections and extending toward each other to form the vehicle body rear end in reduced volume condition, a rear platform structure movably mounted by said vehicle body, the mounting permitting longitudinal movement toward the rear transverse sections in the expanded volume condition, and a roof structure section rigidly carried by each of the said longitudinal side wall sections, the roof sections and the said fixed roof overlapping in the reduced volume condition and expanding the roof structure in the expanded volume condition.

4. A vehicle body for a vehicle, the body being based on a stationary frame, said body having fixed parts and a part which is movable with respect to the fixed parts, when the vehicle is stopped, to expand the volume of the vehicle body beyond that in travel condition, said movable part comprising a front wall structure section hinged on a vertical pivot to a fixed part of the body, and comprising a longitudinal side wall section hinged to said front wall section, and a number of strong swingable supports having vertically extending hinge means mounted by the frame, the lower portion of said longitudinal wall section being connected to and supported by the free end regions of said supports, said front wall and longitudinal wall sections being capable of displacement by movement of said supports, in which movement every point of the side wall section describes an arc in horizontal plan, the side wall section as a whole being displaced both longitudinally and transversely, being kept parallel to its original longitudinal disposition presented in the unexpanded state, a transverse back wall structure rigidly joined to and carried by the rear end of the longitudinal wall section and taking part in said movement, a platform mounted upon the vehicle, the mounting thereof permitting rearward movement of the platform toward the transverse back wall structure when the latter moves back together with the longitudinal wall section, both the longitudinal wall section and the platform carrying roof sections rigidly connected thereto.

5. An expansible vehicle body structure providing a vehicular enclosure both when compacted and when expanded, the enclosure being expansible transversely and longitudinally, said body structure comprising opposed spaced-apart longitudinally extending elements removed from the rear of the body, second body elements pivotedly connected respectively to each of the longitudinally extending elements and extending along the outside of the latter when compacted, third body elements pivotedly connected respectively to each of the first body elements, the third body elements extending at least partly along the outside of the second body elements when the body is compacted and providing longitudinal side wall structure for the vehicle body when the body is expanded, internal frame sections extendable transversely in the expanded body condition and serving to bear against the third body elements in said condition, the third body elements having rear end transverse wall structures joined thereto and carried thereby in the expansion and contraction and extending toward each other to at least partly define the rear face of the enclosure in the contracted and in the expanded condition.

6. An expansible vehicle body structure providing a vehicular enclosure both when compacted and when expanded, the enclosure being expansible transversely and longitudinally, said body structure comprising opposed spaced-apart longitudinally extending forward elements, which elements are recessed within the body structure in both the compacted and expanded state of the body, second forward body elements pivotedly connected respectively to each of the longitudinally extending elements and extending along and adjacent the latter when compacted, third body elements pivotedly connected respectively to each of the second body elements, the third body elements extending at least partly along the outside of the second body elements when the body is compacted and providing non-protruding longitudinal side wall structure, rear end transverse structures for the vehicle body when the body is expanded, said transverse structure being joined to the respective third body elements and being carried thereby in the compaction and expansion movements, floor structure carried by the respective third body elements in said movements, and roof structure comprising means rigidly affixed to each of the third body elements respectively and movable therewith in the expansion, and swingable brackets connected to the third body elements and pivoted on vertical pivots to the frame structure of said vehicle body, the brackets constraining the third body elements to substantial parallelism with the longitudinal dimension of the vehicle body.

7. A vehicle body structure expansible transversely and longitudinally and providing a vehicular enclosure both when compacted and when expanded, said body structure comprising opposed spaced-apart longitudinally extending elements, second body elements pivotedly connected respectively to each of the longitudinally extending elements and extending along and adjacent the latter when the body is compacted, third body elements pivotedly connected respectively to each of the second body elements, the third body elements extending at least partly along the outside of the second body elements when the body is compacted and providing longitudinal side wall structure for the vehicle body when the body is expanded, the third body elements carrying floor structure and each having a transverse end portion extending toward the other, said transverse end portions being joined to the respective third body elements, which end portions are adjacent each other when compacted, to define one end wall of the compacted body structure and being spaced apart when the body structure is transversely widened in expansion, and rear floor platform means mounted upon the vehicle, the mounting permitting longitudinal rearward movement thereof into the transversely widened end space.

8. An expansible vehicle body structure providing a vehicular enclosure both when compacted and when expanded, the enclosure being expansible transversely and longitudinally, said body structure comprising opposed spaced-apart longitudinally extending elements, second body elements pivotedly connected respectively to each of the longitudinally extending elements and extending along and adjacent the outside of the latter when compacted, third body elements pivotedly connected respectively to each of the second body elements, the third body elements extending at least partly along the outside of the second body elements when the body is compacted and providing longitudinal side wall structure for the vehicle body when the body is expanded, the body structure having stationary roof and floor structure, the third body elements each having floor structure affixed thereto and roof structure rigidly affixed thereto and serving as extensions of the stationary floor and roof structure when expanded, the third body elements each having a transverse end portion extending toward the other, which end portions define one end of the body enclosure when compacted, and strong supporting brackets for the third body elements having vertical hinges mounted on a stationary part of the vehicle body structure and connected to the lower portions of the third body elements.

9. A vehicle body for a vehicle, the body being based on a stationary frame, said body having fixed parts and structure which is movable with respect to the fixed parts, to expand the volume of the vehicle body transversely and longitudinally, said movable structure comprising opposite, longitudinal, side wall structural sections and a number of strong side wall section supporting brackets, support hinges on the frame providing a vertically extending axis of rotation for the respective brackets, the brackets being rotatable forwardly and rearwardly about the vertical axes through an angle greater than 90 degrees to compact and expand the volume, the lower portions of said longitudinal wall structure sections being connected to and supported by the free end portions of said supports, transversely extending end wall sections joined to and carried by the longitudinal wall sections, each longitudinal structural wall section and its said supports moving together, in which movement every point of the side wall structural sections describes an arc in horizontal plan, each side wall section as a whole, together with the end wall sections, being displaced both longitudinally and transversely, each side wall section being kept parallel to its original longitudinal disposition present in the unexpanded state, each end wall section being kept parallel to its original transverse disposition present in the unexpanded state, the end wall sections defining at least part of an end wall of the body in compacted and in expanded condition of the body, the hinges of the supporting brackets being set back from the opposite end wall of the body at least a sufficient distance such that, and the arm lengths of the brackets being such that, when the movable structure is compacted against the fixed part of the body the ends of the said side wall sections extend at most no farther than the said opposite end of the body, the reduced compacted condition as well as the increased volume in expanded condition being limited laterally by the same longitudinal side wall sections.

10. A vehicle body for a vehicle, the body being based on a stationary frame, said body having fixed parts and structure which is movable with respect to the fixed parts, to expand the volume of the vehicle body transversely and longitudinally beyond that in normal retracted condition, said movable structure comprising opposite, longitudinal, side wall structural sections, and a number of strong side wall section supporting brackets, the brackets having upwardly-downwardly extending bracing means affixed to their inner end portions, upwardly-downwardly extending weight-supporting hinge means mounted on the frame, the hinge means pivotally supporting the bracing means along a vertically extending axis of rotation for the respective brackets, the brackets being rotatable forwardly and rearwardly about said axis through an angle greater than 90 degrees to contract and expand the volume, the lower portions of said longitudinal wall structure sections being connected to and supported by the free end portions of said supports, rear end wall sections rigidly joined to and carried by the longitudinal wall sections, said longitudinal structural wall sections being capable of displacement by movement of said supports, together with the rear end wall sections, in which movement every point of the side wall structural sections describes an arc in horizontal plan, each side wall section as a whole being displaced both longitudinally and transversely, being kept parallel to its original longitudinal disposition present in the unexpanded state, the reduced volume in normal condition as well as the increased volume in expanded condition being limited laterally by the same longitudinal side wall sections, the rear end wall sections moving toward each other in the volume reduction to normal condition, to at least partly define the rear wall of the body.

11. An expansible vehicle body structure providing a vehicular enclosure both when compacted and when expanded, the enclosure being expansible transversely and longitudinally, said body structure comprising opposed spaced-apart longitudinally extending elements adjacent one end thereof, second body elements pivotedly connected respectively to each of the longitudinally extending elements at points removed from said end and extending along and adjacent the outside of the said longitudinally extending elements when compacted, third body elements pivotedly connected respectively to each of the second body elements, the third body elements extending at least partly along the outside of the second body elements when the body is compacted and providing longitudinal side wall structure for the vehicle body when the body is expanded, the body structure having stationary roof structure, the third body elements each having a roof structure section rigidly affixed thereto and serving as extensions of the stationary roof structure when expanded, the third body elements each having joined thereto and moving therewith a transverse opposite end portion extending toward the other, which end portions move toward each other when the enclosure is compacted and which move apart when the enclosure is expanded, and strong supporting brackets for the third body elements having vertical hinges mounted on a stationary part of the vehicle body structure and connected to the lower portions of the third body elements.

12. An expansible vehicle body structure providing a vehicular enclosure both when compacted and when expanded, the enclosure being expansible transversely and longitudinally, said body structure comprising at the front portion opposed spaced-apart longitudinally extending, recessed elements, second body elements pivotedly connected respectively to each of the longitudinally extending elements at points removed from the front end of the body and extending along and adjacent the outside of the longitudinally extending elements when compacted, third body elements pivotedly connected respectively to each of the second body elements, the third body elements extending at least partly along the outside of the second body elements and extending at most no farther than the front end of the body when the body is compacted and providing longitudinal side wall structure for the vehicle body when the body is expanded, the body structure having stationary roof and floor structure, the third body elements each having floor structure carried thereby and roof structure rigidly affixed thereto, and serving as extensions of the stationary floor and roof structure when expanded, the third body elements each having joined thereto a transverse end portion extending toward the other end portion, which end portions at least partly define one end of the body enclosure when compacted, and strong supporting brackets for the third body elements having vertical hinges mounted on a stationary part of the vehicle body structure and connected to the lower portions of the third body elements.

13. A vehicle having a body case comprising rigid, stationary structure having side walls, and comprising a structure movable with respect to the respectively stationary parts, said body case being capable of transverse and lengthwise expansion by moving said movable structure, said movable structure comprising a rigid assembly including a lengthwise extending first wall section defining a lengthwise extending side wall of the body case in the expanded and in the contracted state of the body case, pivot means constraining the movement of the said side wall section so that it remains in parallel with the side of the stationary structure, the pivot means permitting forward and rearward displacement of the said wall section through an angle greater than 90 degrees, said rigid assembly further comprising an upwardly-downwardly extending transverse end wall section and a first transversely extending roof section, each joined to the said side wall section, said movable structure including an opposite upwardly-downwardly extending second end wall section hingedly joined to the first mentioned side wall section and hingedly joined to a part of the stationary structure, the hinges of the second end wall section joining it to the stationary structure being set transversely outwardly of the body case, whereby the upwardly-downwardly extending second end wall section lies substantially parallel to the respectively stationary part of the body case when the second end wall section lies adjacent said stationary part in a completely folded state of the movable structure, the respectively stationary rigid structure including a roof section joined thereto, the latter roof section and said first roof section at least in part overlapping in all positions of said expansion and in the fully contracted position.

14. A vehicle having a body case comprising rigid, stationary structure having side walls, and comprising a structure movable with respect to the respectively stationary parts, said body case being capable of transverse and lengthwise expansion by moving said movable structure, said movable structure comprising a rigid assembly including a lengthwise extending first side wall section defining a lengthwise side wall of the body case in the expanded and in the contracted state of the body case, pivot means constraining the movement of the said side wall section so that it remains in parallel with the side of the stationary structure, the pivot means permitting forward and rearward displacement of the said wall section, said rigid assembly further comprising an upwardly-downwardly extending transverse end wall section and a first transversely extending roof section, each joined to the said side wall section, said movable structure including an opposite upwardly-downwardly extending second end wall section hingedly joined to the first side wall section and hingedly joined to a part of the stationary structure, the hinges of the second end wall section joining it to the stationary structure being set transversely outwardly of the body case, whereby the second end wall section lies substantially parallel to the respectively stationary part of the body case when said second end wall section lies adjacent said stationary part in a completely folded state of the movable structure, the respectively stationary rigid structure including a roof section joined thereto, the latter roof section and the first roof section at least in part overlapping in all positions of said expansion and in the fully contracted position, the pivot means permitting rotation through an angle of 180 degrees whereby the first side wall section can be substantially aligned with a side wall of the respectively stationary structure when the body case is fully expanded lengthwise, the pivot means being set back from the other end of the body a sufficient distance such that, and the length of the second end wall section being such that, the end of the first side wall section extends at most no farther than the said other end of the body.

15. A vehicle having a vehicle body carried by a stationary frame, said body having relatively fixed structure and movable structure, whereby the body is expansible, said movable structure comprising a first rigid assembly including a first longitudinal side wall section, and joined thereto a transverse back wall section and a first roof section, the movable structure further comprising a rigid rear assembly comprising a floor section, and joined thereto a rear end enclosure wall section and a second roof section, said rear assembly being mounted by the vehicle, the mounting thereof permitting longitudinal movement rearwardly in the expansion and frontwardly in the compaction of the body; a number of swingable supports for the first rigid assembly of the movable structure; the relatively fixed structure comprising a second longitudinal side wall section located toward the front end of the vehicle, said second wall section having a longitudinal portion recessed transversely, said movable structure including a front end wall section pivotedly connected to the front end portion of the first longitudinal side wall section and pivotedly connected to the said second wall section toward the rearward part of the recessed portion of the latter, the recessed portion being of at least sufficient length to receive the front end wall section when the body is compacted, the relatively fixed structure comprising a stationary third roof section, the movable and stationary roof sections at least in part overlapping in the compacted and in the expanded state of the body.

16. A vehicle having a vehicle body carried by a stationary frame, said body having relatively fixed structure and movable structure, whereby the body is expansible, said movable structure comprising a first rigid assembly including a first longitudinal side wall section, and joined thereto a transverse back wall section and a first roof section, the movable structure further comprising a rigid end assembly at a first body end and comprising a floor section and having joined thereto an end enclosure wall section and a second roof section, said end assembly being mounted by the vehicle, the mounting thereof permitting longitudinal movement rearwardly in the expansion and frontwardly in the compaction of the body; a number of swingable brackets for the first rigid assembly of the movable structure, the brackets being mounted by the frame, the brackets having upwardly-downwardly extending bracing means affixed to their inner end portions, upwardly-downwardly extending weight-supporting hinge means mounted on the frame, the hinge means pivotedly supporting the bracing means along an upwardly-downwardly extending pivot axis; the relatively fixed structure comprising a second longitudinal side wall section located at a region removed from the said first body end, said second wall section having a longitudinal portion recessed transversely within the body, said movable structure including an end wall section pivotedly connected to an end portion of the movable longitudinal side wall section and pivotedly connected to the said fixed second wall section at a location adjacent an endwise removed part of the recessed portion of the latter, the recessed portion being of at least sufficient length to receive the front end wall section when the body is compacted, the relatively fixed structure comprising a stationary third roof section, the movable and stationary roof sections overlapping in the compacted and in the expanded state of the body.

17. The apparatus defined in claim 15, said movable and relatively fixed structure being duplicated at opposite longitudinal sides of the body, and four columns supported by the frame and supporting the stationary roof sections, two of the columns being disposed toward the rear end of the fixed structure and two being positioned forwardly of the rear end of the vehicle and serving to support pivots pivotedly connecting the respective front end wall sections to the second longitudinal side wall sections of the relatively fixed structure, as recited.

18. The apparatus defined in claim 15, and arms each hinged at one end to the longitudinal edge of the stationary roof section and connected at the other end to the upper edge of the first longitudinal side wall section, said arms being swingable against the edge of the roof to lie parallel to the said swingable supports, the latter underlying the body.

19. The apparatus defined in claim 15, said movable and relatively fixed structure being duplicated at opposite longitudinal sides of the body, four columns supported by the frame and supporting the stationary roof sections, two of the columns being disposed toward the rear end of the fixed structure and two being positioned forwardly of the rear end of the vehicle and serving to support pivots pivotedly connecting the respective front end wall sections to the second longitudinal side wall sections of the relatively fixed structure, as recited, the two first roof sections joined to the two first longitudinal side wall sections of the movable structure underlying the stationary roof structure in the compacted state of the body and each having slots for the columns to permit outward movement of said two first roof sections.

20. A vehicle having a vehicle body carried by a stationary frame, said body having relatively fixed structure and movable structure, whereby the body is expansible transversely and longitudinally beyond that in retracted condition, said movable structure comprising four first rigid assemblies each including a first longitudinal side wall section, and rigidly joined thereto a transverse back wall section and a first roof section, the movable structure further comprising two rigid end assemblies each comprising a floor section and joined thereto a rear end enclosure wall section, and a second roof section, said end assemblies being mounted by the vehicle, the mounting thereof permitting longitudinal movement thereof rearwardly and frontwardly in the expansion and compaction of the body; a number of swingable support brackets for the first rigid assembly of the movable structure, the brackets being mounted on the frame; the brackets having upwardly extending bracing means affixed thereto on their inner end portions, weight-supporting hinge means on the frame pivotedly carrying said bracing means and providing an upwardly extending axis of rotation for the respective brackets, the brackets being free to rotate forwardly and rearwardly about said axis through an angle greater than 90°; the relatively fixed structure comprising two opposite second longitudinal side wall sections located intermediate the ends of the body, said fixed second wall sections being recessed transversely within the body, said movable structure including four end wall sections respectively pivotedly connected to end portions of the movable longitudinal side wall sections and respectively pivotedly connected to the said fixed second wall sections at locations adjacent endwise removed parts of the latter, the latter being each of at least sufficient length to receive two of the said latter end wall sections when the body is compacted, the relatively fixed structure comprising a stationary third roof section, the movable and stationary roof sections overlapping in the compacted and in the expanded state of the body.

21. A vehicle body for a vehicle, the body being based on a stationary frame, said body having fixed parts and structure which is movable with respect to the fixed parts, to expand the volume of the vehicle body transversely and longitudinally, said movable structure comprising opposite, longitudinal, side wall structural sections and a number of strong side wall section supporting brackets, support hinges on the frame providing a vertically extending axis of rotation for the respective brackets, the brackets being rotatable forwardly and rearwardly about the vertical axes through an angle greater than 90 degrees to compact and expand the volume, the lower portions of said longitudinal wall structure sections being connected to and supported by the free end portions of said supports, transversely extending end wall sections joined to and carried by the longitudinal wall sections, each longitudinal structural wall section and its said supports moving together, in which movement every point of the side wall structural sections describes an arc in horizontal plan, each side wall section as a whole, together with the end wall sections, being displaced both longitudinally and transversely, each side wall section being kept parallel to its original longitudinal disposition present in the unexpanded state, each end wall section being kept parallel to its original transverse disposition in the unexpanded state, the hinges of the supporting brackets being set back from the opposite end wall of the body at least a sufficient distance such that, and the arm lengths of the brackets being such that, when the movable structure is compacted against the fixed part of the body the ends of the said side wall sections extend at most no farther than the said opposite end of the body, the reduced compacted condition as well as the increased volume in expanded condition being limited laterally by the same lonigtudinal side wall sections.

22. A vehicle body for a vehicle, the body being based on a stationary frame, said body having fixed parts and structure which is movable with respect to the fixed parts, to expand the volume of the vehicle body transversely and longitudinally, said movable structure comprising opposite, longitudinal, side wall structural sections and a number of strong side wall section supporting brackets, the brackets having vertically extending bracing arms, weight-supporting hinges on the frame, the hinges mounting the bracing arms and providing a vertically extending axis of rotation for the respective brackets, the brackets being rotatable forwardly and rearwardly about the vertical axes through an angle greater than 90 degrees to compact and expand the volume, the lower portions of said longitudinal wall structure sections being connected to and supported by the free end portions of said supports, two opposite end wall structures joined to the body, each longitudinal side wall structural section and its said supports moving together, in which movement every point of the side wall structural sections describes an arc in horizontal plan, each side wall section as a whole being displaced both longitudinally and transversely, each side wall section being kept parallel to its original longitudinal disposition present in the unexpanded state, the hinges of the supporting brackets being set back from the front end wall of the body a sufficient distance such that, and the lengths of the side wall sections and of the arms of the brackets being such that, when the movable structure is compacted forwardly against the fixed part of the body the ends of the said side wall sections extend at most no farther than the forward end of the body, the reduced compacted condition as well as the increased volume in expanded condition being limited laterally by the same longitudinal side wall sections.

23. A vehicle body for a vehicle, the body being based on a stationary frame, said body having fixed parts and parts which are movable with respect to the fixed parts, to expand the volume of the vehicle body transversely and longitudinally, said movable parts comprising four movable structures each comprising a longitudinal, side wall structural section and a number of strong side wall section supporting brackets, support hinges on the frame providing a vertically extending axis of rotation for the respective brackets, the brackets being rotatable forwardly and rearwardly about the vertical axes through an angle greater than 90 degrees to compact and expand the volume, the lower portions of said longitudinal side wall structure sections being connected to and supported by the free end portions of said supports, transversely extending end wall sections rigidly joined to and carried by each of the four movable longitudinal side wall structural sections, each longitudinal side wall structural section and its said supports moving together, in which movement every point of the side wall structural sections describes an arc in horizontal plan, each side wall structural section as a whole, together with the respective end wall sections, being displaced both longitudinally and transversely, each side wall structural section being kept parallel to its original longitudinal disposition present in the unexpanded state, each transversely extending end wall section being kept parallel to its original transverse disposition in the unexpanded state, the end wall sections defining at least part of the end walls of the body in compacted and in expanded condition of the body, the reduced compacted condition as well as the increased volume in expanded condition being limited laterally by the same longitudinal side wall sections.

24. A vehicle having a vehicle body carried by a stationary frame, said body having relatively fixed side wall structure, and four structures movable with respect to the fixed structure to expand the body in non-running condition beyond the volume of the body in travel condition, each of the four movable structures comprising a longitudinal side wall section, four sets of swingable support brackets hinged to side sections of the stationary frame and rotatable with respect thereto around a vertical axis through an angle of at least 90 degrees, the brackets having vertically extending bracing pivot means affixed thereto on their inner end portions, weight-supporting hinge means on the frame carrying said pivot means and thereby providing a vertically extending axis of rotation for the respective brackets, the lower edge portions of the four longitudinal movable wall sections being supported and constrained by, and connected to, the outer free end portions of said support brackets, each side wall section being thereby swung in a direction having longitudinal and transverse components, and remaining in parallelism with its original compacted position.

25. A vehicle body for a vehicle, the body being based on a stationary frame, said body having fixed parts and parts which are movable with respect to the fixed parts, to expand the volume of the vehicle body transversely and longitudinally, said movable parts comprising four movable structures each comprising a longitudinal, side wall structural section and a number of strong side wall section supporting brackets, support hinges on the frame providing a vertically extending axis of rotation for the respective brackets, the brackets being rotatable forwardly and rearwardly about the vertical axes through an angle greater than 90 degrees to compact and expand the volume, the lower portions of said longitudinal side wall structure sections being connected to and supported by the free end portions of said supports, transversely extending end wall sections rigidly joined to and carried by each of the four movable longitudinal side wall structural sections, each longitudinal side wall structural section and its said supports moving together, in which movement every point of the side wall structural sections describes an arc in horizontal plan, each side wall structural section as a whole, together with the respective end wall sections, being displaced both longitudinally and transversely, each side wall structural section being kept parallel to its original longitudinal disposition present in the unexpanded state, each transversely extending end wall section being kept parallel to its original transverse disposition in the unexpanded state, the end wall sections defining at least part of the end walls of the body in compacted and in expanded condition of the body, the reduced compacted condition as well as the increased volume in expanded condition being limited laterally by the same longitudinal side wall sections, said four movable structures carrying roof sections respectively, and two opposite rigid end structures movably mounted upon the stationary part of the vehicle, the mounting thereof permitting longitudinal forward and rearward movement to enlarge the body, said rigid end structures comprising floor means, end wall means and roof means, the body having stationary roof structure, the roof sections, roof means and roof structure at least in part overlapping in the compacted and the expanded state of the body.

26. A vehicle body for a vehicle, the body being based on a relatively stationary frame, said body having fixed parts and a part which is movable with respect to the fixed parts to expand the volume of the vehicle body transversely and longitudinally beyond that in retracted condition, said movable part comprising opposite longitudinal upwardly extending side wall structural sections and a number of strong, side wall section-supporting, swinging brackets, the brackets having vertically extending pivot means affixed thereto on their inner end portions, weight-supporting hinge means on the frame carrying said pivot means and providing a vertically extending axis of rotation for the respective brackets, the brackets being free to rotate forwardly and rearwardly about said axis through an angle greater than 90 degrees, the lower portions of said longitudinal wall structure sections being connected to and having their weights supported by the outwardly extending free end portions of said brackets, said longitudinal structural wall sections and said supports moving together as a unit, in which movement every point of the side wall structural sections describes a horizontal arc, each side wall section as a whole being displaced both longitudinally and transversely, and being kept parallel to its original longitudinal disposition as presented in the unexpanded state, the reduced volume in retracted condition as well as the increased volume in expanded condition being limited laterally by the same longitudinal side wall sections.

27. An expansible vehicle body structure providing a vehicular enclosure both when compacted and when expanded, the enclosure being expansible transversely and longitudinally, said body structure comprising a stationary frame having opposed spaced-apart longitudinally extending elements, second body elements pivotedly connected respectively to each of the longitudinally extending elements and extending along and substantially parallel to the outside of the latter when compacted, third body elements pivotedly connected respectively to each of the second body elements, the third body elements extending at least partly along the outside of and substantially parallel to the second body elements when the body is compacted and providing longitudinal side wall structure for the vehicle body when the body is expanded, and a number of strong, swingable weight-supporting brackets, the brackets having upwardly-downwardly extending pivot means affixed to their inner end portions, upwardly-downwardly extending weight-supporting hinge means mounted on the frame, the hinge means pivotedly supporting the pivot means along an upwardly-downwardly extending axis line, the lower portions of the longitudinal wall sections being supported and constrained by, and connected to, the free end portions of the brackets, the enclosure being expanded by the simultaneous swinging of the brackets and the pivoting of the second and third body elements, the brackets pivoting forwardly and rearwardly to compact and expand the enclosure, the longitudinal wall sections being constrained thereby to parallelism with the original compacted position thereof.

28. A vehicle body for a vehicle, the body being based on a stationary frame, said body having fixed parts including a front wall and a part which is movable with respect to the fixed parts to expand the volume of the vehicle body transversely and longitudinally, said movable part comprising front wall sections hinged on vertical pivots to fixed parts of the body, and comprising two opposite longitudinal side wall sections hinged to said front wall sections, and overlying them in parallelism therewith when compacted, and a number of strong swingable supports having vertically extending hinge means mounted on the frame, the lower portions of said longitudinal wall sections being connected to and supported by the free end portions of said supports, said front wall sections and longitudinal wall sections and said supports moving as a unit, in which movement every point of the side wall sections describes an arc in horizontal plan, each side wall section as a whole being displaced both longitudinally and transversely, being kept parallel to its original longitudinal disposition in the unexpanded state, and transverse rear end sections connected to and carried by the longitudinal side wall sections in said movement, and forming part of the rear wall structure of the body in expanded condition, the hinges of the swingable supports being set back from the front wall of the body at least a sufficient distance such that, and the arm lengths of the swingable supports and the lengths of the longitudinal side wall sections being such that, when the movable structure is swung forwardly to fully compact the body, the ends of said sections extend at most no farther forward than the front wall of the body.

References Cited in the file of this patent

UNITED STATES PATENTS

| | | |
|---|---|---|
| 1,964,894 | Rohne | July 3, 1934 |
| 2,006,477 | Pendry | July 2, 1935 |
| 2,136,130 | Gorlenko | Nov. 8, 1938 |
| 2,150,615 | Sword | Mar. 14, 1939 |
| 2,343,261 | Marple | Mar. 7, 1944 |
| 2,368,936 | McGehee | Feb. 6, 1945 |
| 2,561,921 | Guillot | July 24, 1951 |
| 2,581,192 | La Fleur | Jan. 1, 1952 |
| 2,636,773 | Van Tassel | Apr. 28, 1953 |

FOREIGN PATENTS 528,037    Canada    July 24, 1956
(Corresponding German Patent 822,783, Nov. 29, 1951)